United States Patent
Ohashi et al.

(10) Patent No.: US 9,335,920 B2
(45) Date of Patent: May 10, 2016

(54) REMOTE CONTROL APPARATUS, REMOTE CONTROL SYSTEM, INFORMATION PROCESSING METHOD OF REMOTE CONTROL APPARATUS, AND PROGRAM

(75) Inventors: Yoshinori Ohashi, Tokyo (JP); Shin Ito, Tokyo (JP)

(73) Assignee: Sony Corporation (JP)

( * ) Notice: Subject to any disclaimer, the term of this patent is extended or adjusted under 35 U.S.C. 154(b) by 718 days.

(21) Appl. No.: 12/925,634

(22) Filed: Oct. 26, 2010

(65) Prior Publication Data

US 2011/0126096 A1 May 26, 2011

(30) Foreign Application Priority Data

Nov. 24, 2009 (JP) ................................ P2009-266702

(51) Int. Cl.

| | |
|---|---|
| G06F 3/048 | (2013.01) |
| G06F 3/0488 | (2013.01) |
| H04N 5/44 | (2011.01) |
| H04N 21/41 | (2011.01) |
| H04N 21/422 | (2011.01) |
| H04N 21/462 | (2011.01) |
| H04N 21/4722 | (2011.01) |

(52) U.S. Cl.
CPC .......... *G06F 3/04883* (2013.01); *H04N 5/4403* (2013.01); *H04N 21/4126* (2013.01); *H04N 21/42215* (2013.01); *H04N 21/4622* (2013.01); *H04N 21/4722* (2013.01); *G08C 2201/30* (2013.01); *H04N 2005/443* (2013.01); *H04N 2005/4407* (2013.01)

(58) Field of Classification Search
CPC ... G06F 3/016; G06F 3/0488; G06F 3/04886; G06F 3/04883; G06F 3/0481
USPC .................................................... 715/702, 810
See application file for complete search history.

(56) References Cited

U.S. PATENT DOCUMENTS

| | | | | |
|---|---|---|---|---|
| 4,736,437 | A * | 4/1988 | Sacks et al. ................... | 382/216 |
| 5,134,497 | A * | 7/1992 | Kim .............................. | 386/225 |
| 5,258,748 | A * | 11/1993 | Jones ............................ | 345/172 |
| 5,929,848 | A * | 7/1999 | Albukerk et al. ............. | 715/700 |
| 6,094,197 | A * | 7/2000 | Buxton et al. ................ | 715/863 |
| 6,138,056 | A * | 10/2000 | Hardesty et al. ............. | 700/174 |
| 6,727,830 | B2 * | 4/2004 | Lui et al. ........................ | 341/20 |
| 6,952,644 | B2 * | 10/2005 | Nakagawa .................... | 701/438 |
| 7,002,553 | B2 * | 2/2006 | Shkolnikov ................... | 345/169 |
| 7,073,187 | B1 * | 7/2006 | Hendricks et al. ............. | 725/36 |
| 7,363,309 | B1 * | 4/2008 | Waite et al. ........................ | 1/1 |

(Continued)

*Primary Examiner* — Jung-Mu Chuang
(74) *Attorney, Agent, or Firm* — Lerner, David, Littenberg, Krumholz & Mentlik, LLP

(57) ABSTRACT

A remote control apparatus includes a display panel, an operation detector detecting an operation of touching the display panel, a remote controller remotely controlling an electronic apparatus in accordance with the touch operation, an item selection unit allowing a user to select a selection item in the display panel, a touch operation determination unit comparing a duration time of an operation of touching the selection item with a predetermined threshold value, a detailed information obtaining unit obtaining detailed information on the selection item from the electronic apparatus when the duration time is smaller than the threshold value, a related information obtaining unit obtaining related information on the selection item using the selection item as a searching condition from an external service apparatus when the duration time is equal to or larger than the threshold value, and a display controller controlling display of the detailed information or the related information.

6 Claims, 8 Drawing Sheets

(56) References Cited

U.S. PATENT DOCUMENTS

| | | | |
|---|---|---|---|
| 7,721,227 B2* | 5/2010 | Ronkainen | 715/822 |
| 7,734,729 B2* | 6/2010 | Du et al. | 709/219 |
| 7,764,739 B2* | 7/2010 | Yamada et al. | 375/240.12 |
| 7,840,907 B2* | 11/2010 | Kikuchi et al. | 715/790 |
| 8,019,389 B2* | 9/2011 | Kim et al. | 455/566 |
| 8,086,275 B2* | 12/2011 | Wykes et al. | 455/566 |
| 8,112,718 B2* | 2/2012 | Nezu et al. | 715/810 |
| 8,144,120 B2* | 3/2012 | Vassigh et al. | 345/156 |
| 8,180,767 B2* | 5/2012 | Christian et al. | 707/723 |
| 8,203,640 B2* | 6/2012 | Kim et al. | 348/333.12 |
| 8,271,908 B2* | 9/2012 | Li et al. | 715/863 |
| 8,363,008 B2* | 1/2013 | Ryu et al. | 345/156 |
| 8,427,511 B2* | 4/2013 | Shin et al. | 345/661 |
| 8,448,071 B2* | 5/2013 | Ahn et al. | 715/746 |
| 8,509,854 B2* | 8/2013 | Kim et al. | 455/566 |
| 8,521,146 B2* | 8/2013 | Lee | G06F 3/0482 455/412.1 |
| 8,548,528 B2* | 10/2013 | Kim et al. | 455/566 |
| 8,584,048 B2* | 11/2013 | Falchuk | G06F 3/04883 715/716 |
| 8,674,945 B2* | 3/2014 | Seo | 345/173 |
| 8,713,463 B2* | 4/2014 | Kim et al. | 715/768 |
| 8,732,319 B2* | 5/2014 | Tian | 709/228 |
| 9,081,477 B2* | 7/2015 | Kang | G06F 3/04815 |
| 9,176,703 B2* | 11/2015 | Kim | G06F 3/1446 |
| 2002/0087598 A1* | 7/2002 | Carro | 707/513 |
| 2002/0150869 A1* | 10/2002 | Shpiro | 434/156 |
| 2002/0184339 A1* | 12/2002 | Mackintosh | G06Q 30/02 709/218 |
| 2003/0071855 A1* | 4/2003 | Kim | G06F 3/03547 715/810 |
| 2003/0154479 A1* | 8/2003 | Brenner et al. | 725/40 |
| 2004/0019499 A1* | 1/2004 | Murashita | 705/1 |
| 2004/0030741 A1* | 2/2004 | Wolton et al. | 709/202 |
| 2005/0025087 A1* | 2/2005 | Tamura | 370/320 |
| 2005/0068151 A1* | 3/2005 | Ushida | 340/3.71 |
| 2005/0076024 A1* | 4/2005 | Takatsuka et al. | 707/3 |
| 2005/0125144 A1* | 6/2005 | Nakagawa | 701/200 |
| 2005/0180504 A1* | 8/2005 | Yamada et al. | 375/240.12 |
| 2005/0198095 A1* | 9/2005 | Du | G06Q 10/087 709/200 |
| 2006/0015908 A1* | 1/2006 | Vermola et al. | 725/63 |
| 2006/0081695 A1* | 4/2006 | Jung | G06Q 10/06 235/375 |
| 2006/0294086 A1* | 12/2006 | Rose et al. | 707/3 |
| 2007/0028269 A1* | 2/2007 | Nezu et al. | 725/52 |
| 2007/0033647 A1* | 2/2007 | Yang et al. | 726/18 |
| 2007/0070472 A1* | 3/2007 | Kato et al. | 358/537 |
| 2007/0204308 A1* | 8/2007 | Nicholas et al. | 725/86 |
| 2007/0233369 A1* | 10/2007 | Ng et al. | 701/208 |
| 2007/0236476 A1* | 10/2007 | Suzuki | 345/173 |
| 2007/0274420 A1* | 11/2007 | Billings | 375/344 |
| 2007/0298785 A1* | 12/2007 | Lee | 455/425 |
| 2008/0180504 A1* | 7/2008 | Ishii et al. | 347/104 |
| 2008/0259045 A1* | 10/2008 | Kim et al. | 345/173 |
| 2008/0295015 A1* | 11/2008 | Liu et al. | 715/772 |
| 2009/0066368 A1* | 3/2009 | Mei | G11C 7/1051 326/83 |
| 2009/0075694 A1* | 3/2009 | Kim et al. | 455/556.1 |
| 2009/0215500 A1* | 8/2009 | You et al. | 455/566 |
| 2009/0276702 A1* | 11/2009 | Bamford et al. | 715/702 |
| 2010/0118025 A1* | 5/2010 | Smith et al. | 345/418 |
| 2010/0121714 A1* | 5/2010 | Bovenschulte et al. | 705/14.55 |
| 2010/0138782 A1* | 6/2010 | Rainisto | G06F 3/0482 715/808 |
| 2010/0146459 A1* | 6/2010 | Repka | 715/863 |
| 2010/0306249 A1* | 12/2010 | Hill et al. | 707/769 |
| 2010/0306699 A1* | 12/2010 | Hsu | G06K 9/00355 715/810 |
| 2011/0029373 A1* | 2/2011 | Steelberg et al. | 705/14.41 |
| 2011/0041096 A1* | 2/2011 | Larco et al. | 715/835 |
| 2011/0244844 A1* | 10/2011 | Aoike | 455/418 |
| 2011/0264526 A1* | 10/2011 | Mital et al. | 705/14.55 |
| 2012/0216154 A1* | 8/2012 | Li | G06F 3/0482 715/863 |
| 2012/0309460 A1* | 12/2012 | Kim et al. | 455/564 |
| 2013/0278533 A1* | 10/2013 | Kim et al. | 345/173 |
| 2013/0285914 A1* | 10/2013 | Pasquero et al. | 345/168 |
| 2014/0066131 A1* | 3/2014 | Yoo | 455/566 |

* cited by examiner

FIG. 4
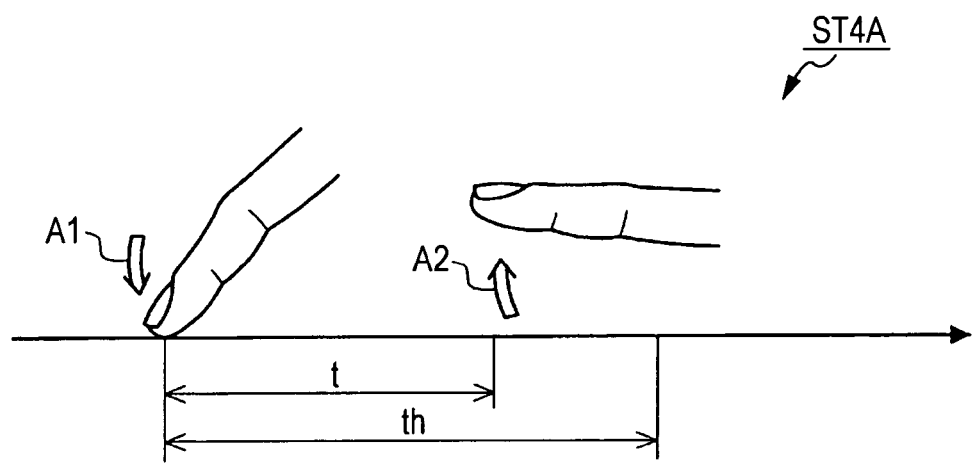
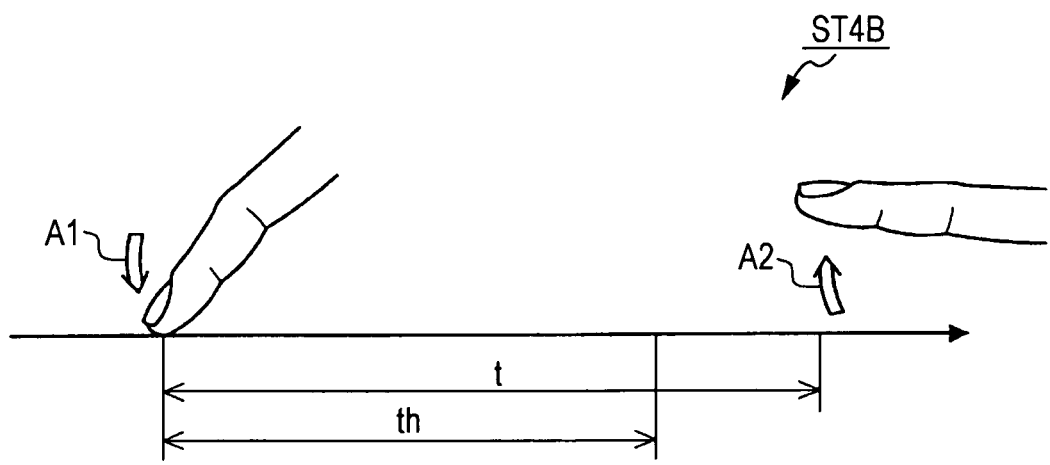

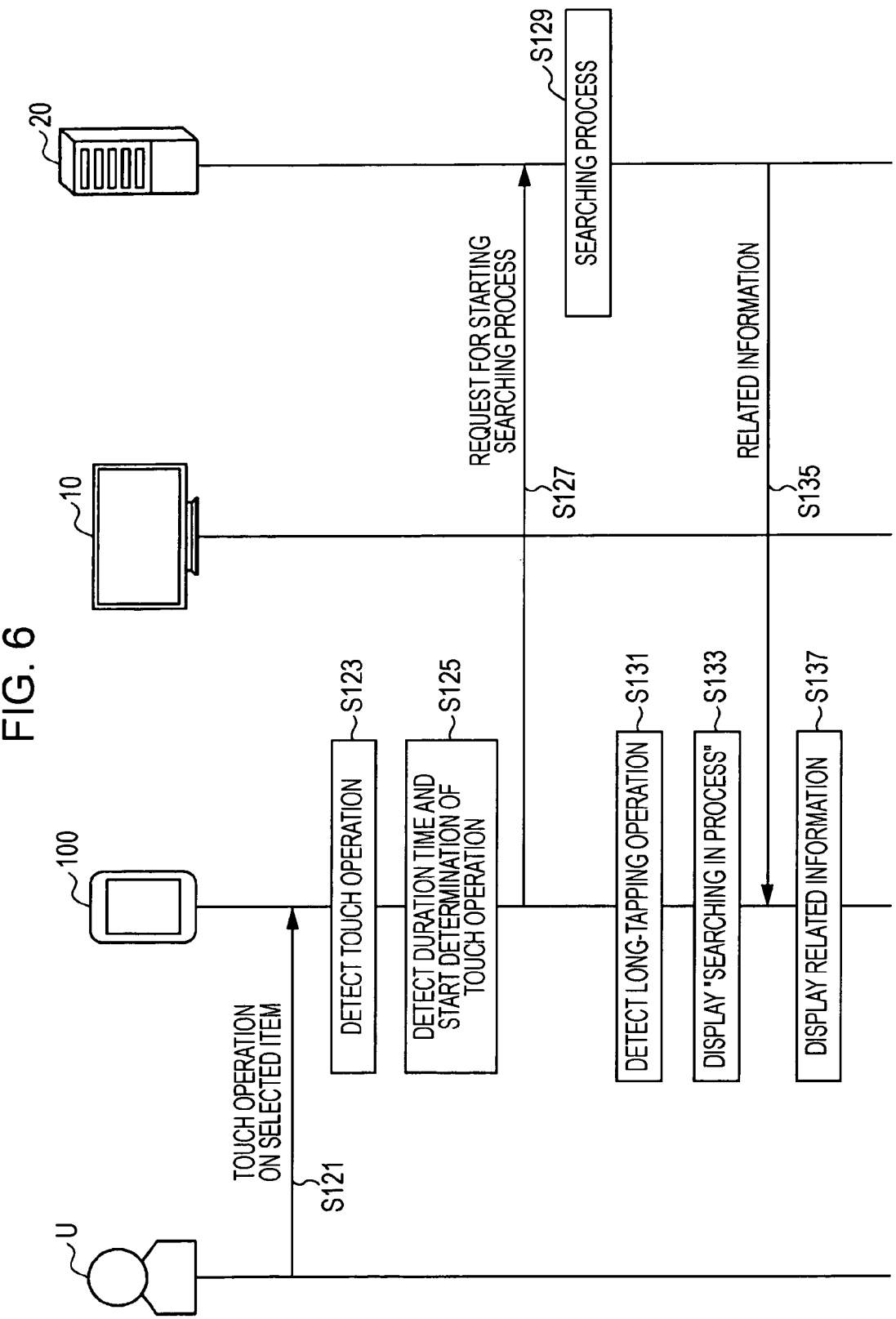

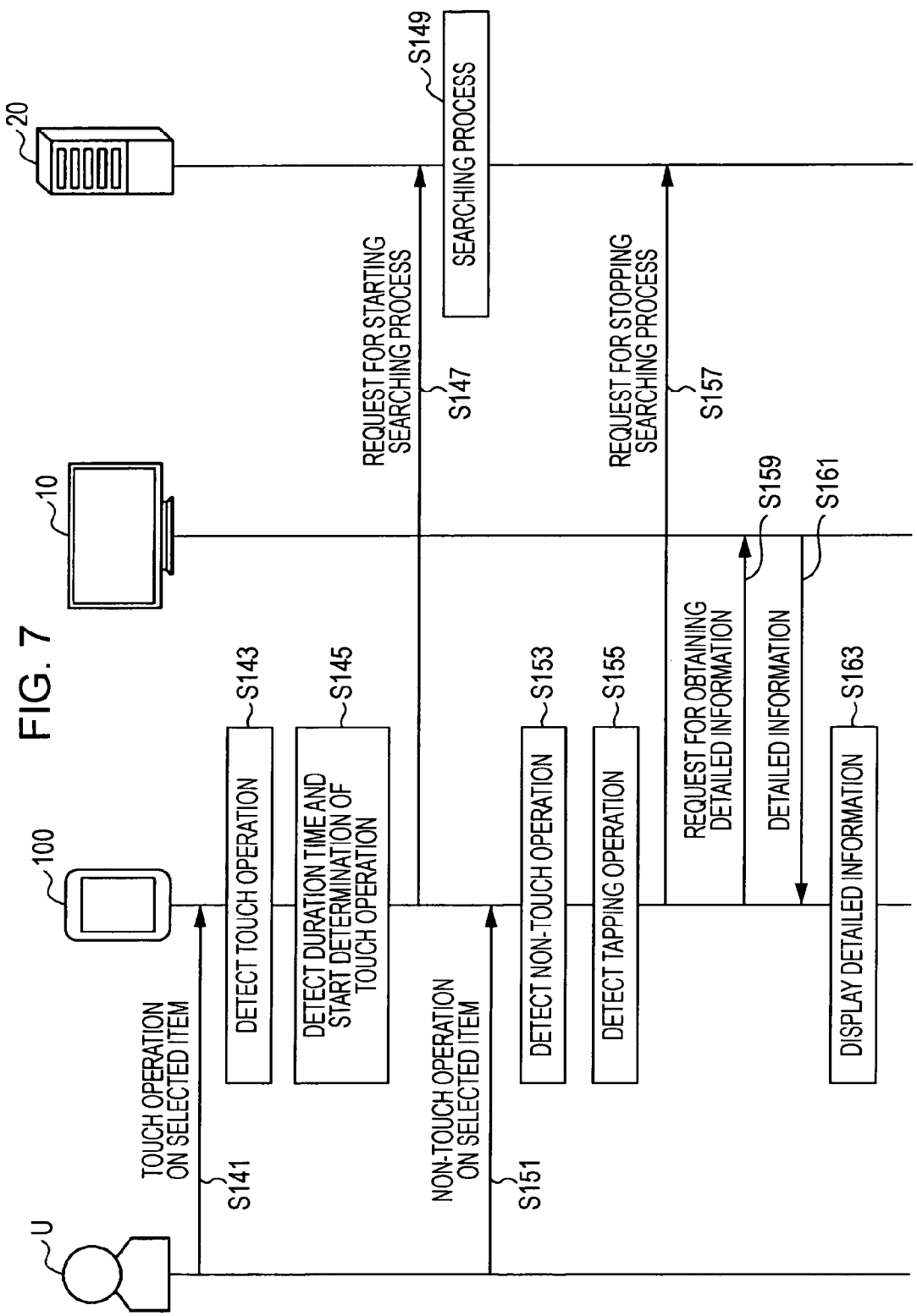

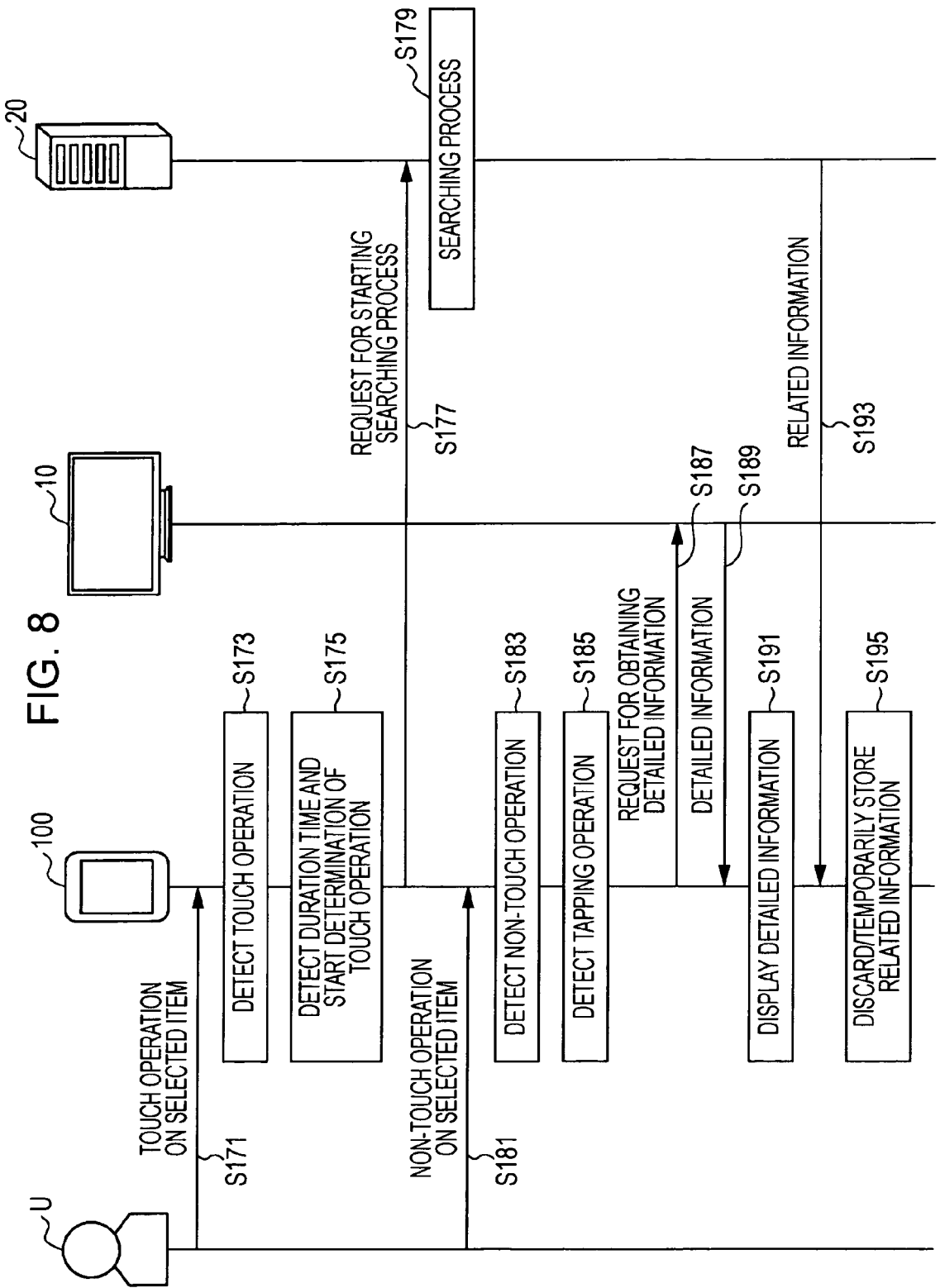

REMOTE CONTROL APPARATUS, REMOTE CONTROL SYSTEM, INFORMATION PROCESSING METHOD OF REMOTE CONTROL APPARATUS, AND PROGRAM

CROSS-REFERENCE TO RELATED APPLICATION

The present application claims priority from Japanese Patent Application No. JP 2009-266702 filed in the Japanese Patent Office on Nov. 24, 2009, the entire content of which is incorporated herein by reference.

BACKGROUND OF THE INVENTION

1. Field of the Invention

The present invention relates to a remote control apparatus, a remote control system, an information processing method employed in the remote control apparatus, and a program.

2. Description of the Related Art

In recent years, remote control apparatuses including a touch panel display used to remotely control electronic apparatuses such as a television receiver apparatus and a video reproducing apparatus have been broadly used. Such a remote control apparatus obtains content information and the like in accordance with a user's operation performed using a touch panel from a television receiver apparatus or an external service so as to display the content information and the like.

SUMMARY OF THE INVENTION

When obtaining content information and the like from a television receiver apparatus, the user specifies a desired selection item in a display panel so as to view the content information and the like corresponding to the selection item. However, when the content information and the like are to be obtained from an external service apparatus, the user should specify a desired item as a searching condition and specify obtainment of the content information and the like from the external service apparatus. Therefore, the user may find an operation for obtaining the content information and the like from the external service to be bothersome.

Furthermore, in general, when the content information and the like are to be obtained from the external service apparatus, processing response is delayed when compared with a case where the content information and the like are obtained from the television receiver apparatus. Therefore, the user may be frustrated with the processing response when the content information and the like are obtained from the external service apparatus.

Accordingly, it is desirable to provide a remote control apparatus, a remote control system, an information processing method employed in the remote control apparatus, and a program, which improve usability when the user obtains content information and the like from an external service apparatus.

According to an embodiment of the present invention, there is provided a remote control apparatus including a display panel, an operation detector which detects an operation of touching the display panel, a remote controller which remotely controls an electronic apparatus in accordance with the touch operation, an item selection unit which allows a user to select one of selection items displayed in the display panel, a touch operation determination unit which compares a duration time of an operation of touching the selection item with a predetermined threshold value, a detailed information obtaining unit which obtains detailed information on the selection item from the electronic apparatus when the duration time is smaller than the threshold value, a related information obtaining unit which obtains related information on the selection item using the selection item as a searching condition from an external service apparatus when the duration time is equal to or larger than the threshold value, and a display controller which controls display of the obtained detailed information or the obtained related information in the display panel.

With this configuration, when detecting the operation of touching one of the selection items, the remote control apparatus compares the duration time of the touch operation with the predetermined threshold value, obtains information on the selection item in accordance with the duration time, and displays the information. The remote control apparatus obtains detailed information on the selection item from the electronic apparatus when the duration time is smaller than the threshold value whereas the remote control apparatus obtains related information on the selection item using the selection item as the searching condition from the external service apparatus when the duration time is equal to or larger than the threshold value. Accordingly, the user may obtain and view the related information on the selection item by controlling the duration time t of the touch operation instead of by specifying an obtainment of the related information from the external service apparatus.

When the operation of touching one of the selection items is detected, the related information obtaining unit may request the external service apparatus to start a searching process using the selection item as the searching condition.

When the related information is not obtained from the external service apparatus by the time when the duration time reaches the threshold value, the display controller may control display of identification information representing that the searching process is in progress, and when the related information is obtained from the external service apparatus, the display controller may control display of the obtained related information.

The related information obtaining unit may request the external service apparatus to stop the searching process when the duration time is smaller than the threshold value.

In a case where the duration time is smaller than the threshold value, the related information obtaining unit may discard or temporarily store the related information obtained from the external service apparatus after a non-touch operation is detected.

According to another embodiment of the present invention, there is provided a remote control system including the remote control apparatus and an electronic apparatus remotely controlled by the remote control apparatus.

According to a still another embodiment of the present invention, there is provided an information processing method employed in the remote control apparatus, including the steps of allowing a user to select one of selection items displayed in the display panel, comparing a duration time of an operation of touching the selection item with a predetermined threshold value, obtaining detailed information on the selection item from the electronic apparatus when the duration time is smaller than the threshold value, and obtaining related information on the selection item using the selection item as a searching condition from an external service apparatus when the duration time is equal to or larger than the threshold value, and controlling display of the obtained detailed information or the obtained related information in the display panel.

According to a further embodiment of the present invention, there is provided a program which causes a computer to execute the information processing method. The program may be provided through a computer readable recording medium or a communication unit.

Accordingly, a remote control apparatus, a remote control system, an information processing method employed in the remote control apparatus, and a program which improve usability when content information and the like are obtained from an external service apparatus are provided.

BRIEF DESCRIPTION OF THE DRAWINGS

FIG. 4 is a diagram illustrating a tapping operation and a long tapping operation;

FIG. 6 is a sequence diagram illustrating a second operation example of the commander;

FIG. 7 is a sequence diagram illustrating a third operation example of the commander; and FIG. 8 is a sequence diagram illustrating a fourth operation example of the commander.

DESCRIPTION OF THE PREFERRED EMBODIMENT

Figure 1:
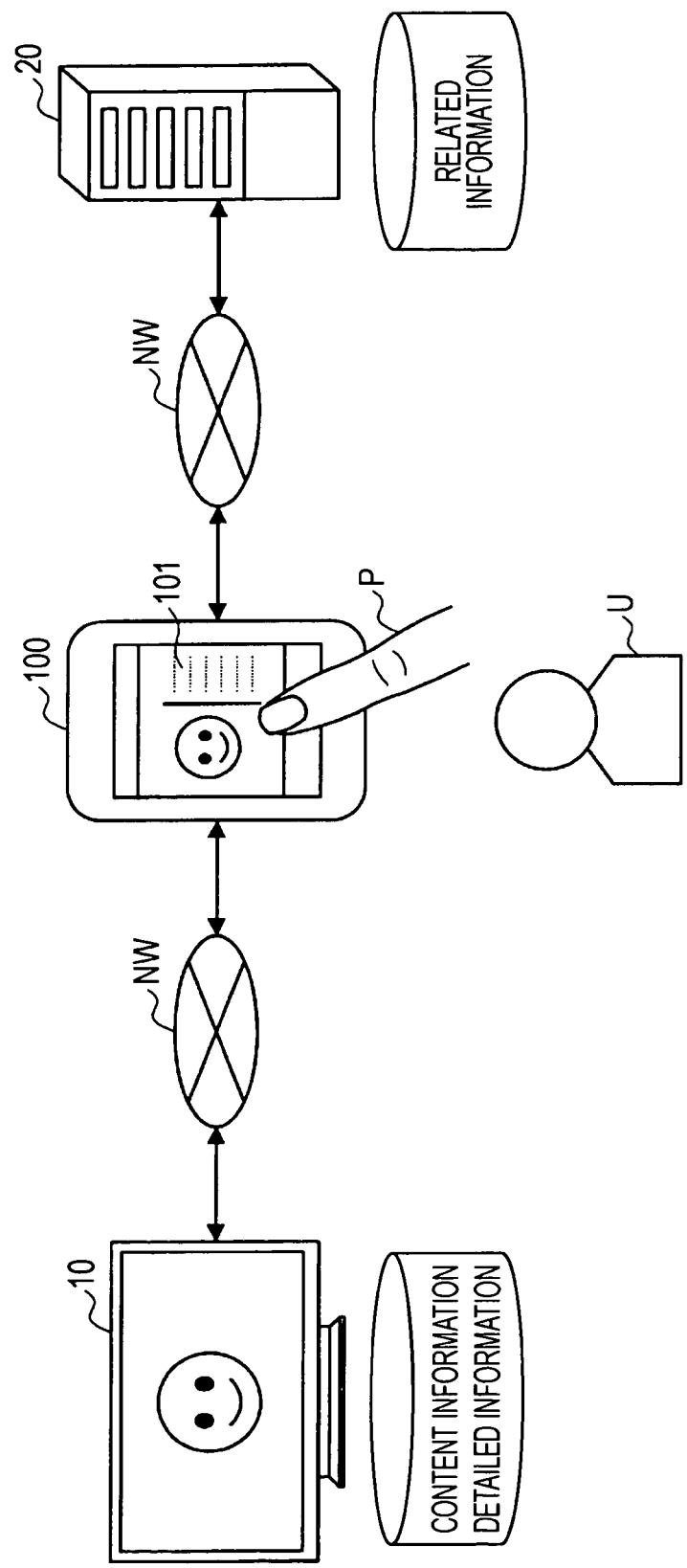
FIG. 1 is a diagram illustrating a configuration of a remote control system according to an embodiment of the present invention.

An embodiment of the present invention will be described hereinafter with reference to the accompanying drawings. Note that, in this specification and the drawings, components having substantially the same functional configurations are denoted by the same reference numerals and redundant descriptions thereof are omitted.

1. Configuration of Remote Control System

First, referring to FIG. 1, a configuration of a remote control system according to the embodiment of the present invention will be described. As shown in FIG. 1, the remote control system includes a commander 100, a television receiver apparatus 10, and at least one external service apparatus 20.

The commander 100 is a dedicated commander, a general-purpose commander, or an information processing apparatus such as a cellular phone or a PDA (Personal Digital Assistance) which has a commander function. The commander 100 includes a touch panel display 101. The television receiver apparatus 10 is an example of an electronic apparatus remotely controlled by the commander 100. The external service apparatus 20 is a WEB server, for example, which provides various services through a network NW.

The commander 100 performs bidirectional communication with the television receiver apparatus 10 through the wired or wireless network NW or without using the network NW. Furthermore, the commander 100 performs bidirectional communication with the external service apparatus 20 through the wired or wireless network NW.

The television receiver apparatus 10 manages information on content (content information) and detailed information. The external service apparatus 20 manages information relating to content. The commander 100 obtains the content information from the television receiver apparatus 10 and displays the content information and obtains the detailed information on content from the television receiver apparatus 10 in accordance with an instruction issued by a user U. Alternatively, the commander 100 obtains the related information from the external service apparatus 20 and displays the information in the touch panel display 101.

2. Outline of Commander 100

Figure 2:
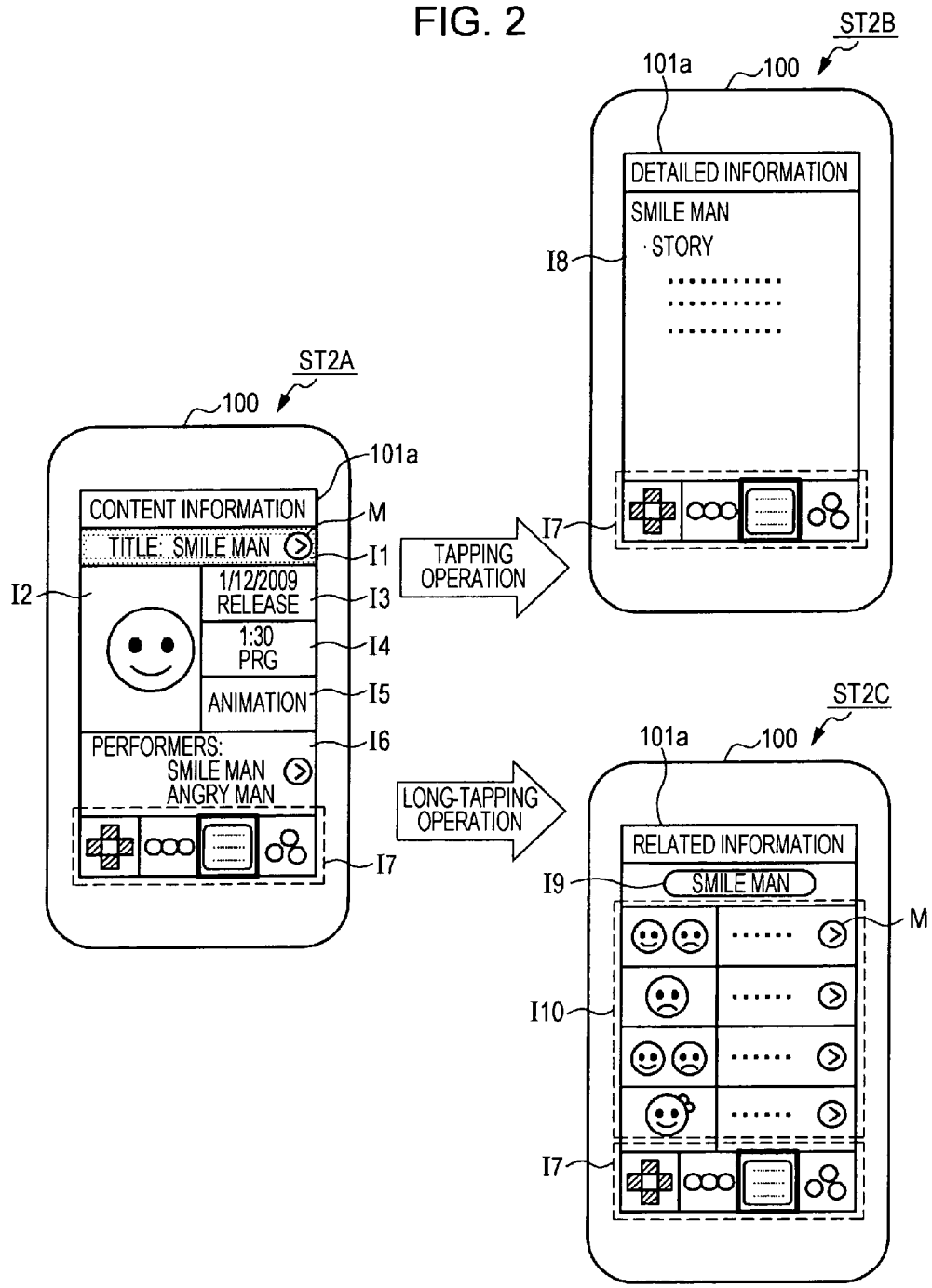
FIG. 2 is a diagram schematically illustrating a commander according to the embodiment of the present invention.

Next, referring to FIG. 2, an outline of the commander 100 according to the embodiment of the present invention will be described. As shown in FIG. 2, the commander 100 obtains detailed information on content from the television receiver apparatus 10 or related information from the external service apparatus 20 depending on a situation of a touch operation performed on a display panel 101a by the user U and displays the information on the display panel 101a.

The display panel 101a displays the content information obtained from the television receiver apparatus 10 as shown as a state ST2A. Note that the content information may be information on content displayed in the television receiver apparatus 10 or information on other content. For example, in the state ST2A, a title I1, an image I2, a reproducible date I3, a reproducing time I4, a category I5, and a performer I6 are displayed. Furthermore, the display panel 101a displays various operation buttons.

The user U performs an operation of touching any one of selection items, such as the title I1 of the content, included in the content information. Identification information marks M representing selectable items are assigned to the selection items. For example, in the state ST2A, the marks M are assigned to the title I1 and the performer I6.

When detecting the operation of touching one of selection items, the commander 100 obtains detailed information on the selection item from the television receiver apparatus 10 or related information on the selection item from the external service apparatus 20, and displays the obtained information in the display panel 101a. For example, in the state ST2A, an operation of touching the title I1 among the selection items is detected.

When detecting the touch operation, the commander 100 detects a duration time t of the touch operation and compares the duration time t with a predetermined threshold value th. When the duration time t is smaller than the threshold value th (that is, when a tapping operation is performed), the commander 100 obtains the detailed information of the selection item from the television receiver apparatus 10 whereas when the duration time t is equal to or larger than the threshold value th (that is, when a long tapping operation is performed), the commander 100 obtains the related information of the selection item from the external service apparatus 20 using the selection item as a searching condition. Note that the tapping operation and the long tapping operation will be described hereinafter.

For example, FIG. 2 shows a case where the tapping operation is performed and detailed information 18 on the content corresponding to the selection item, that is, the title I1, is displayed, as shown as a state ST2B. Note that when the performer I6 is selected from among the selection items, detailed information on a performer is displayed.

Note that the detailed information may be obtained from the television receiver apparatus 10 and/or the commander 100. Alternatively, the detailed information may be obtained from a network service apparatus connected to the television receiver apparatus 10 through the television receiver apparatus 10.

On the other hand, when the long tapping operation is detected, related information I10 on the content corresponding to the title I1 selected from among the selection items is displayed along with an indication 19 of the selection item as shown as a state ST2C. Note that, if the performer I6 is selected from among the selection items, related information on a performer is displayed. Furthermore, a section of the related information 110 includes the marks M representing selectable states of the selection items. Here, when any one of the related information items is selected, further related information regarding the selected related information is displayed.

By this, the user U may obtain the related information on the selection item from the external service apparatus 20 by controlling the duration time t of the touch operation instead of by specifying obtainment of the related information from the external service apparatus 20.

Furthermore, the commander 100 requests the external service apparatus 20 to start of a searching process when detecting the operation of touching a selection item. By this, the user U obtains a result of the searching process from the external service apparatus 20 faster than a case where the start of the search process is requested when the duration time t has reached the threshold value th.

3. Configuration of Commander 100

Figure 3:
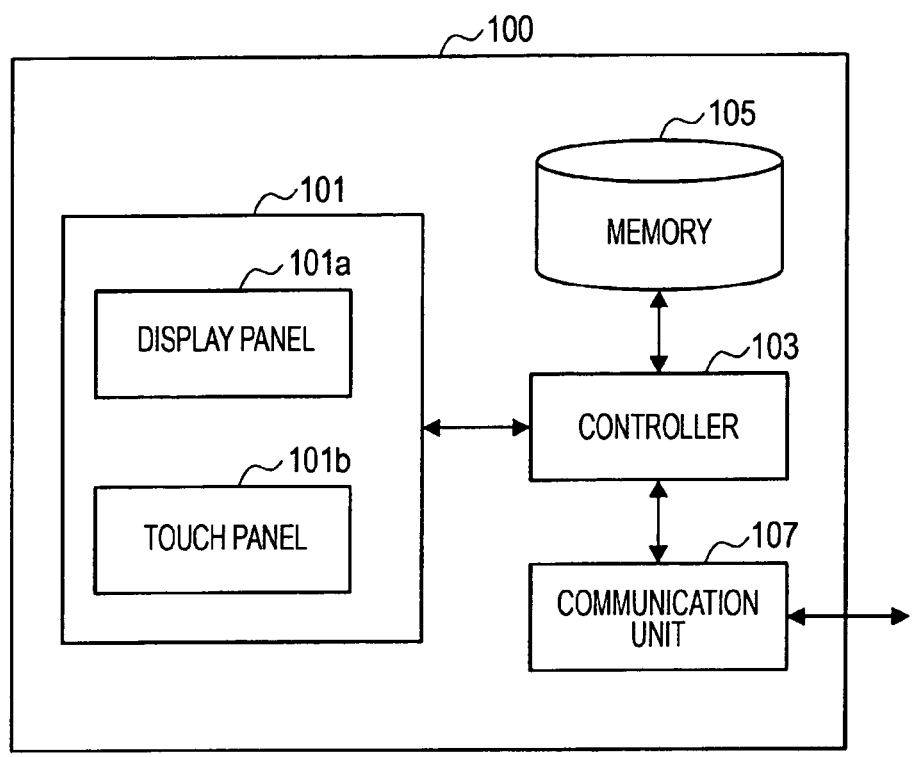
FIG. 3 is a block diagram illustrating a main configuration of the commander.

Next, referring to FIG. 3, a configuration of the commander 100 will be described. As shown in FIG. 3, the commander 100 includes the touch panel display 101, a controller 103, a memory 105, and a communication unit 107.

The touch panel display 101 is formed by laminating a touch panel 101b (operation detector) on the display panel 101a. An example of the display panel 101a includes a liquid crystal display (LCD). Examples of the touch panel 101b include a panel employing a resistance film method, a panel employing a static capacitance method, a panel employing an ultrasonic wave method, or a panel employing an infrared ray method.

The touch panel 101b detects a state of a finger P or a stylus touching a panel surface. The touch panel 101b supplies a touch signal to a controller 103 when the finger P has touched the panel surface and supplies a cancel signal to the controller 103 when the finger P has been released from the panel surface.

Furthermore, the touch panel 101b supplies a coordinate signal corresponding to a touched position to the controller 103 while the finger P has been touching the touch panel 101b. Note that the coordinate signal represents an X-Y coordinate of the touched position on the touch panel 101b.

The controller 103 includes a CPU (Central Processing Unit), a RAM (Random Access Memory), and a ROM (Read Only Memory). The CPU executes a program stored in the ROM using the RAM as a work memory and controls the various units of the commander 100. The controller 103 functions as a remote control unit, an item selection unit, a touch operation determination unit, a detailed information obtaining unit, a related information obtaining unit, and a display controller by executing programs.

The memory 105 is a nonvolatile memory such as an EEPROM (Electrically Erasable and Programmable Read Only Memory) and stores display data, command information, and the like. The memory 105 may store detailed information corresponding to content information and may store related information obtained from the external service apparatus 20 as described hereinafter.

The communication unit 107 transmits a predetermined operation command to the television receiver apparatus 10 in response to an operation input performed by the user U. Furthermore, the communication unit 107 transmits a request for obtaining content information or detailed information to the television receiver apparatus 10 and transmits a request for starting or stopping the searching process of information relating to content. The communication unit 107 receives the content information and the detailed information from the television receiver apparatus 10 and receives the related information from the external service apparatus 20.

The controller 103 generates coordinate data by decoding the coordinate signal supplied from the touch panel 101b and controls the various units of the commander 100 in accordance with the coordinate data, the touch signal, and the cancel signal.

The controller 103 reads the command information from the memory 105 in accordance with the operation input performed by the user U and supplies the command information to the communication unit 107. The communication unit 107 transmits a predetermined operation command to the television receiver apparatus 10 in accordance with the command information.

The controller 103 reads data stored in the memory 105 so as to generate display data for a graphical user interface (GUI) screen, and supplies the display data to the display panel 101a. The display panel 101a displays the GUI screen on the basis of the display data.

The controller 103 displays the content information supplied from the television receiver apparatus 10 through the communication unit 107 in the display panel 101a and prompts the user U to perform an operation of touching one of the selection items included in the content information. The controller 103 detects a duration time t of the operation of touching one of the selection items and compares the duration time t with the predetermined threshold value th so as to examine the touch operation.

When the duration time t is smaller than the threshold value th, the controller 103 obtains detailed information on the selection item from the television receiver apparatus 10 through the communication unit 107. On the other hand, when the duration time t is equal to or larger than the threshold value th, the controller 103 obtains related information on the selection item from the external service apparatus 20 through the communication unit 107 using the selection item as a searching condition. Then, the controller 103 controls the display panel 101a so that the obtained detailed information or the obtained related information is displayed.

4. Operation of Commander 100

Next, referring to FIGS. 4 to 8, operation of the commander 100 will be described. FIG. 4 is a diagram illustrating the tapping operation and the long tapping operation. FIGS. 5 to 8 are sequence diagrams illustrating first to fourth operation examples of the commander 100.

In FIG. 4, temporal changes of states of touches on the display panel 101a are shown. As shown in FIG. 4, the controller 103 determines whether the tapping operation is performed or the long tapping operation is performed in accordance with the duration time t from when a touch operation A1 (a press using a finger or the like) is detected on the display panel 101a to when a non-touch operation A2 (a release of the finger or the like) is detected.

Specifically, when the duration time t of the touch operation is smaller than the predetermined threshold value th (as shown as a state ST4A), it is determined that the tapping operation has been performed whereas when the duration time t is equal to or larger than the predetermined threshold value th (as shown as a state ST4B), it is determined that the long tapping operation has been performed. Note that if a change amount of a touch position exceeds a predetermined threshold value within a period of time from when the touch operation is detected to when the non-touch operation is detected, it may be determined that the touch operation has changed to the non-touch operation.

Next, the first to fourth operation examples of the commander 100 will be described. Note that redundant descriptions among the operation examples are omitted.

FIRST OPERATION EXAMPLE

Figure 5:
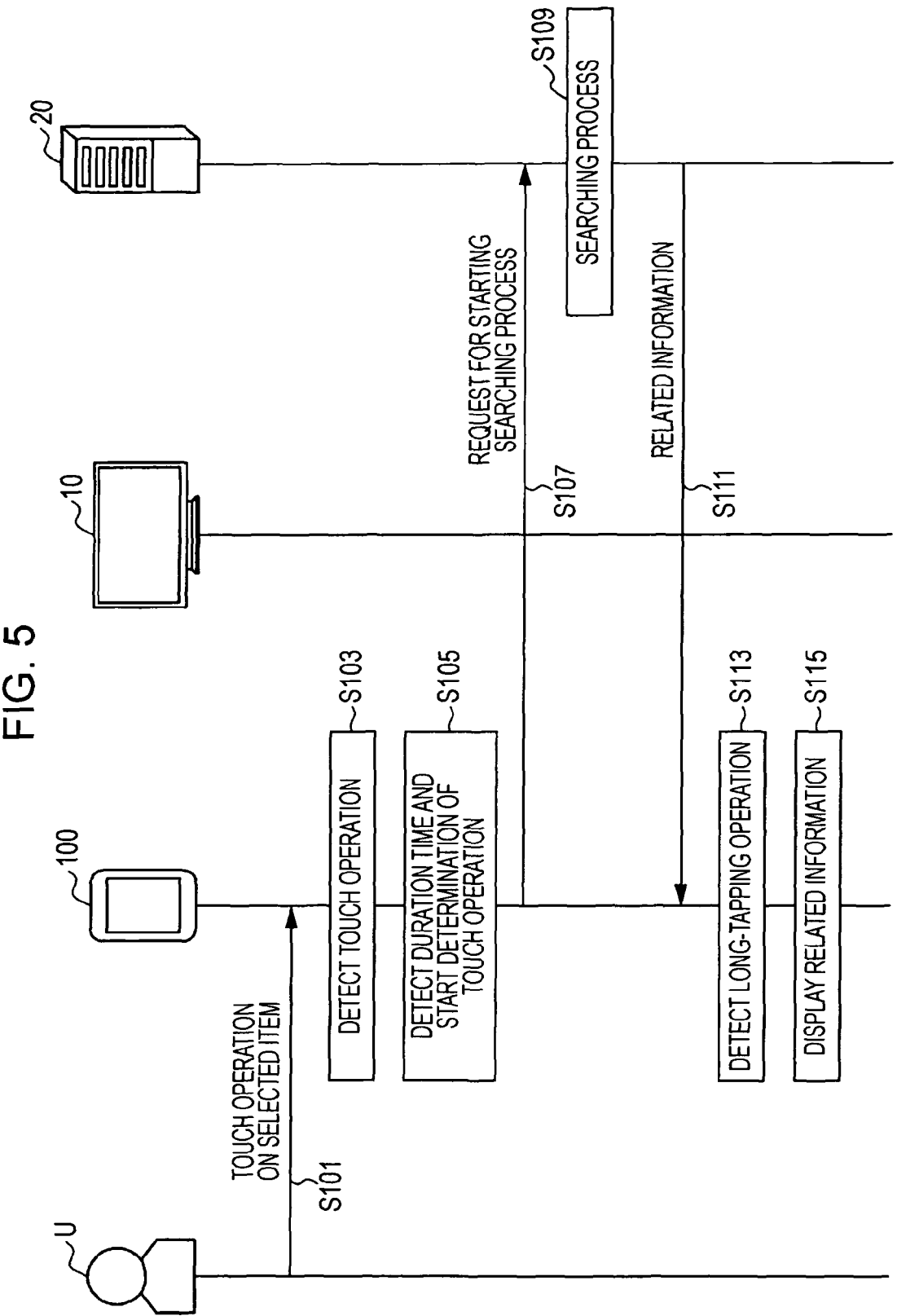
FIG. 5 is a sequence diagram illustrating a first operation example of the commander.

In the first operation example shown in FIG. 5, when the user U performs the operation of touching one of the selection items in step S101, the controller 103 detects the operation of touching one of the selection items in step S103. Then, the commander 100 starts detection of the duration time t of the touch operation and examination of the touch operation in step S105.

Furthermore, when detecting the touch operation, the controller 103 transmits a request for starting the searching process using the selection item as a searching condition to the external service apparatus 20 through the communication unit 107 in step S107. The external service apparatus 20 performs the searching process in response to the start request in step S109. After the searching process is completed, the external service apparatus 20 transmits obtained related information to the commander 100 in step S111.

In the first operation example, the controller 103 receives the related information before it is determined determining the long tapping operation has been performed. That is, the controller 103 determines that the long tapping operation has been performed after receiving the related information in step S113. Therefore, the controller 103 displays the obtained related information in the display panel 101a in step S115.

SECOND OPERATION EXAMPLE

In the second operation example shown in FIG. 6, as with the first operation example, the commander 100 detects a touch operation and transmits a request for starting the searching process to the external service apparatus 20, and the external service apparatus 20 performs the searching process in step S212 to step S129.

Note that, in the second operation example, the controller 103 determines that the long tapping operation has been performed before receiving related information in step S131. Therefore, the controller 103 instructs the display panel 101a to display identification information representing "searching in process" when detecting the long tapping operation in step S133. Thereafter, when receiving the related information after it is determined that the long tapping operation has been performed in step S135, the controller 103 instructs the display panel 101a to display the obtained related information in step S137.

THIRD OPERATION EXAMPLE

In the third operation example shown in FIG. 7, as with the first operation example, the commander 100 detects a touch operation and transmits a request for starting the searching process to the external service apparatus 20, and the external service apparatus 20 performs the searching process in step S141 to step S149.

Note that, in the third operation example, the user U performs a non-touch operation (release operation) on one of the selection items in step S151 without receiving related information. The controller 103 detects a non-touch operation, that is, the controller 103 detects the tapping operation in step S153 and step S155. Therefore, in step S157, the controller 103 transmits a request for stopping the searching process to the external service apparatus 20 through the communication unit 107 when the tapping operation is detected.

Next, the controller 103 transmits a request for obtaining detailed information on the selection item to the television receiver apparatus 10 through the communication unit 107 in step S159. The television receiver apparatus 10 transmits the detailed information on the selection item to the commander 100 in response to the obtaining request in step S161. Thereafter, the controller 103 instructs the display panel 101a to display the obtained detailed information in step S163.

FOURTH OPERATION EXAMPLE

In the fourth embodiment shown in FIG. 8, as with the first operation example, the commander 100 detects a touch operation and transmits a request for starting the search process to the external service apparatus 20, and the external service apparatus 20 performs the search process in step S171 to step S179.

Note that, in the fourth embodiment, the user U performs a non-touch operation (release operation) on one of the selection items in step S181 before receiving related information. The controller 103 detects the non-touch operation, that is, the controller 103 detects the tapping operation in step S183 and step S185. Therefore, the controller 103 transmits a request for obtaining detailed information on the selection item to the television receiver apparatus 10 through the communication unit 107 in step S187 when detecting the tapping operation. The television receiver apparatus 10 transmits the detailed information on the selection item to the commander 100 in response to the obtaining request in step S189. Thereafter, the controller 103 instructs the display panel 101a to display the obtained detailed information in step S191.

Note that when receiving the related information from the external service apparatus 20 in step S193 after detecting the tapping operation, the controller 103 discards or temporarily stores the received related information in the memory 105 or the like in step S195.

5. Conclusion

As described above, according to the embodiment of the present invention, when detecting a touch operation performed on one of the selection items on the display panel 101a, the commander 100 compares a duration time t of the touch operation with the predetermined threshold value th, obtains information on the selection item in accordance with the duration time t, and displays the information. Note that when the duration time t is smaller than the threshold value th, the commander 100 obtains detailed information on the selection item from the television receiver apparatus 10 whereas when the duration time t is equal to or larger than the threshold value th, the commander 100 obtains related information on the selection item from the external service apparatus 20 using the selection item as a searching condition. Accordingly, the user U may obtain and view the related information on the selection item by controlling the duration time t of the touch operation instead of by specifying an obtainment of the related information from the external service apparatus 20.

Although the preferred embodiment of the present invention has been described above with reference to the accompanying drawings, the present invention is not limited to these examples. It is apparent for those who skilled in the art that various changes and modifications may be made within the scope of the invention described in Claims, and therefore, these changes and modifications are also included in the scope of the invention.

What is claimed is:

1. A remote control apparatus comprising:
a display panel;
an operation detector which detects an operation of touching the display panel;
a remote controller which remotely controls an electronic apparatus in accordance with the touch operation;
a hardware controller configured to function as
(i) an item selection unit which allows a user to select a selection item from a number of selection items displayed in the display panel;
(ii) a touch operation determination unit which compares a duration time of an operation of touching the selection item with a predetermined threshold value;
(iii) a detailed information obtaining unit which obtains detailed information on the selection item from the electronic apparatus when the duration time is smaller than the threshold value; and
(iv) a related information obtaining unit which obtains related information on the selection item using the selection item as a searching condition from an external service apparatus when the duration time is equal to or larger than the threshold value; and
a display controller which controls display of the obtained detailed information or the obtained related information in the display panel,
in which the electronic apparatus is separate from the external service apparatus such that the detailed information and the related information are each obtained from a separate apparatus,
in which the item selection unit and the touch operation determination unit enable the user to select a specific one of the electronic apparatus and the external service apparatus from which to obtain information by appropriately selecting the duration time of a respective touching operation of the selection item at a first display state of the display panel, such that (i) when the user desires to select the electronic apparatus at the first display state from which to obtain the respective information, the user touches the selection item so that the duration time thereof is smaller than the threshold value, and (ii) when the user desires to select the external service apparatus at the first display state from which to obtain the respective information, the user touches the selection item so that the duration time thereof is equal to or larger than the threshold value,
wherein, when the operation of touching the selection item is detected and prior to completion of a comparison of the duration time with the predetermined threshold value by the touch operation determination unit, the related information obtaining unit requests the external service apparatus to start a searching process using the selection item as the searching condition, and
wherein in a case where an operation of a release of the touching of the selection item is detected such that the comparison of the duration time with the predetermined threshold indicates that the duration time is smaller than the threshold value, (i) the related information obtaining unit requests the external service apparatus to stop the searching process and (ii) the detailed information obtaining unit obtains the detailed information on the selection item from the electronic apparatus.

2. The remote control apparatus according to claim 1, wherein the electronic apparatus is a television receiver and the external service apparatus is a WEB server.

3. A remote control apparatus comprising:
a display panel;
an operation detector which detects an operation of touching the display panel;
a remote controller which remotely controls an electronic apparatus in accordance with the touch operation;
a hardware controller configured to function as
(i) an item selection unit which allows a user to select a selection item from a number of selection items displayed in the display panel;
(ii) a touch operation determination unit which compares a duration time of an operation of touching the selection item with a predetermined threshold value;
(iii) a detailed information obtaining unit which obtains detailed information on the selection item from the electronic apparatus when the duration time is smaller than the threshold value; and
(iv) a related information obtaining unit which obtains related information on the selection item using the selection item as a searching condition from an external service apparatus when the duration time is equal to or larger than the threshold value; and
a display controller which controls display of the obtained detailed information or the obtained related information in the display panel,
in which the electronic apparatus is separate from the external service apparatus such that the detailed information and the related information are each obtained from a separate apparatus,
in which the item selection unit and the touch operation determination unit enable the user to select a specific one of the electronic apparatus and the external service apparatus from which to obtain information by appropriately selecting the duration time of a respective touching operation of the selection item at a first display state of the display panel, such that (i) when the user desires to select the electronic apparatus at the first display state from which to obtain the respective information, the user touches the selection item so that the duration time thereof is smaller than the threshold value, and (ii) when the user desires to select the external service apparatus at the first display state from which to obtain the respective information, the user touches the selection item so that the duration time thereof is equal to or larger than the threshold value,
wherein, when the operation of touching the selection item is detected and prior to completion of a comparison of the duration time with the predetermined threshold value by the touch operation determination unit, the related information obtaining unit requests the external service apparatus to start a searching process using the selection item as the searching condition, and
wherein, in a case where an operation of a release of the touching of the selection item is detected such that the duration time is smaller than the threshold value, (i) the related information obtaining unit discards or temporarily stores the related information obtained from the external service apparatus after the release operation is detected and (ii) the obtained detailed information is displayed in the display panel by use of the display controller.

4. A remote control system including a remote control apparatus and an electronic apparatus remotely controlled by the remote control apparatus, the remote control apparatus comprising:

a display panel;
an operation detector which detects an operation of touching the display panel;
a remote controller which remotely controls an electronic apparatus in accordance with the touch operation;
a hardware controller configured to function as
   (i) an item selection unit which allows a user to select a selection item from a number of selection items displayed in the display panel;
   (ii) a touch operation determination unit which compares a duration time of an operation of touching the selection item with a predetermined threshold value;
   (iii) a detailed information obtaining unit which obtains detailed information on the selection item from the electronic apparatus when the duration time is smaller than the threshold value; and
   (iv) a related information obtaining unit which obtains related information on the selection item using the selection item as a searching condition from an external service apparatus when the duration time is equal to or larger than the threshold value; and
a display controller which controls display of the obtained detailed information or the obtained related information in the display panel,
in which the electronic apparatus is separate from the external service apparatus such that the detailed information and the related information are each obtained from a separate apparatus,
in which the item selection unit and the touch operation determination unit enable the user to select a specific one of the electronic apparatus and the external service apparatus from which to obtain information by appropriately selecting the duration time of a respective touching operation of the selection item at a first display state of the display panel, such that (i) when the user desires to select the electronic apparatus at the first display state from which to obtain the respective information, the user touches the selection item so that the duration time thereof is smaller than the threshold value, and (ii) when the user desires to select the external service apparatus at the first display state from which to obtain the respective information, the user touches the selection item so that the duration time thereof is equal to or larger than the threshold value,
wherein, when the operation of touching the selection item is detected and prior to completion of a comparison of the duration time with the predetermined threshold value by the touch operation determination unit, the related information obtaining unit requests the external service apparatus to start a searching process using the selection item as the searching condition, and
wherein in a case where an operation of a release of the touching of the selection item is detected such that the comparison of the duration time with the predetermined threshold indicates that the duration time is smaller than the threshold value, (i) the related information obtaining unit requests the external service apparatus to stop the searching process and (ii) the detailed information obtaining unit obtains the detailed information on the selection item from the electronic apparatus.

5. An information processing method employed in a remote control apparatus, comprising the steps of:
allowing a user to select a selection item from a number of selection items displayed in the display panel;
comparing a duration time of an operation of touching the selection item with a predetermined threshold value;
obtaining detailed information on the selection item from an electronic apparatus when the duration time is smaller than the threshold value, and obtaining related information on the selection item using the selection item as a searching condition from an external service apparatus when the duration time is equal to or larger than the threshold value; and
controlling display of the obtained detailed information or the obtained related information in the display panel,
in which the electronic apparatus is separate from the external service apparatus such that the detailed information and the related information are each obtained from a separate apparatus,
in which the allowing and comparing steps enable the user to select a specific one of the electronic apparatus and the external service apparatus from which to obtain information by appropriately selecting the duration time of a respective touching operation of the selection item at a first display state of the display panel, such that (i) when the user desires to select the electronic apparatus at the first display state from which to obtain the respective information, the user touches the selection item so that the duration time thereof is smaller than the threshold value, and (ii) when the user desires to select the external service apparatus at the first display state from which to obtain the respective information, the user touches the selection item so that the duration time thereof is equal to or larger than the threshold value,
wherein, when the operation of touching the selection item is detected and prior to completion of a comparison of the duration time with the predetermined threshold value, the external service apparatus is requested to start a searching process using the selection item as the searching condition, and
wherein in a case where an operation of a release of the touching of the selection item is detected such that the comparison of the duration time with the predetermined threshold indicates that the duration time is smaller than the threshold value, (i) the external service apparatus is requested to stop the searching process and (ii) the detailed information on the selection item is obtained from the electronic apparatus.

6. A non-transitory computer readable medium having stored thereon a program which causes a computer to execute an information processing method employed in a remote control apparatus, the information processing method comprising the steps of:
allowing a user to select a selection item from a number of selection items displayed in the display panel;
comparing a duration time of an operation of touching the selection item with a predetermined threshold value;
obtaining detailed information on the selection item from an electronic apparatus when the duration time is smaller than the threshold value, and obtaining related information on the selection item using the selection item as a searching condition from an external service apparatus when the duration time is equal to or larger than the threshold value; and
controlling display of the obtained detailed information or the obtained related information in the display panel,
in which the electronic apparatus is separate from the external service apparatus such that the detailed information and the related information are each obtained from a separate apparatus,
in which the allowing and comparing steps enable the user to select a specific one of the electronic apparatus and the external service apparatus from which to obtain information by appropriately selecting the duration time of a respective touching operation of the selection item at a first display state of the display panel, such that (i) when the user desires to select the electronic apparatus at the first display state from which to obtain the respective information, the user touches the selection item so that the duration time thereof is smaller than the threshold value, and (ii) when the user desires to select the external service apparatus at the first display state from which to obtain the respective information, the user touches the first selection item so that the duration time thereof is equal to or larger than the threshold value, wherein, when the operation of touching the selection item is detected and prior to completion of a comparison of the duration time with the predetermined threshold value, the external service apparatus is requested to start a searching process using the selection item as the searching condition, and wherein in a case where an operation of a release of the touching of the selection item is detected such that the comparison of the duration time with the predetermined threshold indicates that the duration time is smaller than the threshold value, (i) the external service apparatus is requested to stop the searching process and (ii) the detailed information on the selection item is obtained from the electronic apparatus.

* * * * *